(12) United States Patent
Dyson

(10) Patent No.: US 10,336,356 B2
(45) Date of Patent: Jul. 2, 2019

(54) WHEELED SHIPPING CART WITH STACKABLE TRAYS

(71) Applicant: Globe Composite Solutions, Ltd., Stoughton, MA (US)

(72) Inventor: Michael Dyson, Duxbury, MA (US)

(73) Assignee: Globe Composite Solutions, Ltd., Stoughton, MA (US)

( * ) Notice: Subject to any disclaimer, the term of this patent is extended or adjusted under 35 U.S.C. 154(b) by 0 days.

(21) Appl. No.: 15/629,345

(22) Filed: Jun. 21, 2017

(65) Prior Publication Data

US 2017/0369087 A1 Dec. 28, 2017

Related U.S. Application Data

(60) Provisional application No. 62/353,184, filed on Jun. 22, 2016.

(51) Int. Cl.
*B62B 3/00* (2006.01)
*B65D 21/02* (2006.01)
(Continued)

(52) U.S. Cl.
CPC .............. *B62B 3/006* (2013.01); *B62B 3/008* (2013.01); *B62B 3/02* (2013.01); *B62B 5/0093* (2013.01); *B65D 19/0097* (2013.01); *B65D 21/0215* (2013.01); *B65D 85/62* (2013.01); *B65D 88/12* (2013.01); *B65D 88/54* (2013.01);
(Continued)

(58) Field of Classification Search
CPC ....... B62B 5/0093; B62B 3/006; B62B 3/008; B62B 3/02; B62B 3/10; B62B 2202/62; B62B 2205/32; B65D 19/0097; B65D 21/0215; B65D 85/62; B65D 88/12; B65D 88/54; B65D 88/546; B65D 90/18; B65D 90/004; B65D 2590/0066; B65D 2519/00024; B65D 2519/00059; B65D 2519/00094; B65D 2519/00273; B65D 2519/00293; B65D 2519/00298; B65D 2519/00323; B65D 2519/00338; B65D 2519/00378; B65D 2519/00562; B65D 2519/00572; B65D 2519/00786; B65D 2519/00815; B65D 2519/0096; B65D 2519/0097

See application file for complete search history.

(56) References Cited

U.S. PATENT DOCUMENTS 541,989 A * 7/1895 Bowley ................ B65D 88/129
410/46
1,103,689 A 7/1914 Russell
(Continued)

*Primary Examiner* — Patrick D Hawn
(74) *Attorney, Agent, or Firm* — Crowe & Dunlevy

(57) ABSTRACT

A wheeled shipping/transport cart includes a cart frame that supports a plurality of wheels. The cart frame supports a plurality of stackable trays. The trays include a tray frame with opposed end members, a plurality of longitudinal support members disposed between the opposed end members, and a plurality of upright members nesting with upright members of an adjacent tray. A support structure is disposed between the opposed end members to form an arc corresponding to a curved surface of an article to be supported by the support structure. A pin is received through each of the upright members of the plurality of stackable trays to retain the stackable trays in a stacked configuration.

23 Claims, 5 Drawing Sheets

(51) Int. Cl.
*B65D 88/12* (2006.01)
*B65D 88/54* (2006.01)
*B65D 90/00* (2006.01)
*B65D 85/62* (2006.01)
*B62B 3/02* (2006.01)
*B65D 19/00* (2006.01)
*B65D 90/18* (2006.01)
*B62B 5/00* (2006.01)
*B62B 3/10* (2006.01)

(52) U.S. Cl.
CPC ......... *B65D 88/546* (2013.01); *B65D 90/004* (2013.01); *B65D 90/18* (2013.01); *B62B 3/10* (2013.01); *B62B 2202/62* (2013.01); *B62B 2205/32* (2013.01); *B65D 2519/00024* (2013.01); *B65D 2519/00059* (2013.01); *B65D 2519/00094* (2013.01); *B65D 2519/0096* (2013.01); *B65D 2519/0097* (2013.01); *B65D 2519/00273* (2013.01); *B65D 2519/00293* (2013.01); *B65D 2519/00298* (2013.01); *B65D 2519/00323* (2013.01); *B65D 2519/00338* (2013.01); *B65D 2519/00378* (2013.01); *B65D 2519/00562* (2013.01); *B65D 2519/00572* (2013.01); *B65D 2519/00786* (2013.01); *B65D 2519/00815* (2013.01); *B65D 2590/0066* (2013.01)

(56) References Cited

U.S. PATENT DOCUMENTS

| | | | | |
|---|---|---|---|---|
| 2,791,325 A * | 5/1957 | Schecter | ................ | B65D 19/00 108/53.5 |
| 2,877,602 A * | 3/1959 | Larsen | ................ | A47B 47/022 211/175 |
| 2,956,763 A * | 10/1960 | D Arca | ................ | B65D 19/12 108/53.1 |
| 3,459,326 A * | 8/1969 | Betjemann | ........... | B65D 88/005 206/512 |
| 3,783,800 A * | 1/1974 | Bucker | ................ | F26B 25/063 108/53.5 |
| 3,953,047 A | 4/1976 | Morgan | | |
| 4,122,781 A * | 10/1978 | Potter | ..................... | A47F 5/135 108/101 |
| 4,512,591 A * | 4/1985 | Plante | ..................... | B62B 3/002 108/109 |
| 4,671,411 A | 6/1987 | Rehrig et al. | | |
| 4,773,547 A * | 9/1988 | Bell | ................... | A47B 87/0215 108/53.1 |
| 4,847,974 A * | 7/1989 | Pelfrey | .............. | B65D 19/0016 29/421.1 |
| 5,233,931 A * | 8/1993 | McCorkle, Jr. | ........ | B65D 19/12 108/55.1 |
| 5,351,827 A * | 10/1994 | Baka | .......... | B60P 7/12 206/391 |
| 5,411,153 A * | 5/1995 | Unfried | .............. | A47B 87/0215 108/180 |
| 5,593,259 A * | 1/1997 | Kuo | ....................... | B65D 85/68 206/335 |
| 5,609,451 A * | 3/1997 | McCorkle, Jr. | ........... | B60P 7/13 211/194 |
| 5,692,625 A * | 12/1997 | Filipescu | ............... | A47B 43/00 211/194 |
| 6,135,299 A | 10/2000 | Burgess | | |
| 6,279,763 B1 * | 8/2001 | Bush | ...................... | A47B 43/00 108/55.1 |
| 6,290,074 B1 | 9/2001 | Syvuk et al. | | |
| 6,318,570 B1 | 11/2001 | Mueller et al. | | |
| 6,325,224 B1 * | 12/2001 | Brown | ................ | B65D 19/385 108/53.1 |
| 6,601,716 B1 * | 8/2003 | Hayman | ............ | A47B 87/0207 211/194 |
| 6,726,041 B2 * | 4/2004 | Dunn | ..................... | B65D 19/12 206/335 |
| 6,814,529 B2 * | 11/2004 | Junge | ..................... | B65D 19/44 206/335 |
| D501,338 S | 2/2005 | Deasy et al. | | |
| 7,097,054 B2 * | 8/2006 | Beck | ..................... | B65D 19/12 206/335 |
| 7,131,803 B2 * | 11/2006 | Guarisco, Sr. | ........... | B60P 7/12 410/35 |
| 7,159,715 B2 * | 1/2007 | Cornelius | ............. | B65D 19/20 206/386 |
| 7,802,526 B2 * | 9/2010 | Brady | .................... | B65D 19/12 108/53.5 |
| 7,886,673 B2 * | 2/2011 | Korte | ..................... | A01G 9/143 108/110 |
| 8,002,128 B2 * | 8/2011 | Kern | ..................... | B65D 19/12 211/194 |
| 8,006,984 B2 | 8/2011 | Chubb | | |
| 8,083,448 B2 * | 12/2011 | Heinrichs | .............. | B65D 19/12 108/53.1 |
| 8,210,372 B2 | 7/2012 | Visser | | |
| 8,210,374 B2 * | 7/2012 | Harpole | ................ | B65D 19/12 211/194 |
| 8,327,775 B2 * | 12/2012 | Fox Harris | .......... | B65D 19/385 108/53.3 |
| 8,702,111 B2 | 4/2014 | Simoes | | |
| 9,132,994 B2 * | 9/2015 | Ferchaud | ................. | B66C 1/16 |
| 9,149,135 B2 * | 10/2015 | Dovell | .................... | A47F 7/283 |
| 9,492,009 B2 * | 11/2016 | Naka | ................. | A47B 47/0091 |
| 9,586,803 B1 | 3/2017 | Snyker | | |
| 2002/0088766 A1 * | 7/2002 | Flores | ................. | A47B 81/007 211/194 |
| 2003/0150757 A1 * | 8/2003 | Dunn | ................. | B65D 19/12 206/335 |
| 2003/0164318 A1 * | 9/2003 | Lacasse | ................ | B65D 85/48 206/448 |
| 2004/0188307 A1 * | 9/2004 | Beck | ..................... | B65D 19/12 206/503 |
| 2005/0029141 A1 * | 2/2005 | Cornelius | ............. | B65D 19/20 206/386 |
| 2006/0088405 A1 * | 4/2006 | Leimbach | .......... | B29D 30/0016 414/801 |
| 2006/0091096 A1 * | 5/2006 | Velez | ..................... | B62B 3/002 211/194 |
| 2006/0138067 A1 * | 6/2006 | Tourlamain | ............ | B65D 19/12 211/195 |
| 2007/0193906 A1 * | 8/2007 | Cornelius | ............. | B65D 19/20 206/448 |
| 2008/0193247 A1 * | 8/2008 | Zupancich | ............. | B65D 19/10 410/92 |
| 2008/0217276 A1 * | 9/2008 | Brady | .................... | B65D 19/12 211/195 |
| 2010/0112292 A1 * | 5/2010 | Gilfert | ................... | B65D 57/00 428/156 |
| 2011/0253656 A1 * | 10/2011 | Vermeer | ................ | A47F 5/137 211/85.8 |
| 2012/0074084 A1 * | 3/2012 | Barber | ...................... | A47F 7/04 211/85.8 |
| 2015/0257530 A1 * | 9/2015 | Naka | ................. | A47B 47/0091 211/188 |
| 2016/0058182 A1 * | 3/2016 | Langston | ............ | A47B 47/0091 211/85.22 |
| 2016/0137215 A1 | 5/2016 | Ondrasik | | |
| 2017/0369087 A1 * | 12/2017 | Dyson | ................ | B65D 19/0097 |
| 2018/0125231 A1 * | 5/2018 | Reyes | ................ | A47B 47/0091 |

\* cited by examiner

WHEELED SHIPPING CART WITH STACKABLE TRAYS

PRIORITY CLAIM

This application claims priority to U.S. Provisional Patent Application No. 62/353,184, filed on Jun. 22, 2016, and entitled "Configurable, Telescoping, Shipping Racks for Curved Product," the disclosure of which is incorporated by reference.

TECHNICAL FIELD

This disclosure relates in general to systems for shipping articles with an arcuate surface and, in particular, but not by way of limitation, to a wheeled cart with stackable shipping trays configured to support articles with an arcuate surface.

BACKGROUND

Shipping racks are frequently employed to protect the integrity of valuable products and components during transport from the manufacturer to the end user or customer. These products are placed on shipping racks and sometimes secured to these shipping racks and then potentially placed into a shipping container. Once the container has been received, the shipping racks are removed from the container and the products are either removed from the racks and placed into the end users storage system, or these same transport racks can potentially be used by the end user for storage and/or deployment in their facility. Empty racks are re-cycled back to the supplier for future product shipments. When large storage racks are to be moved to storage, they are usually strapped to wooden pallets in order to be moved with a forklift.

Traditionally, shipping racks are made from welded square structural steel or aluminum framing to provide strong support for heavy products. Since the construction materials are square and flat, shipping racks typically carry products that are flat or are only supported from flat ends.

A large curved product in need of structural support during transport may need individual and specialized packaging to be shipped safely and securely to the end user.

SUMMARY

A wheeled shipping/transport cart includes a cart frame that supports a plurality of wheels. The cart frame supports a plurality of stackable trays. The trays include a tray frame with opposed end members, a plurality of longitudinal support members disposed between the opposed end members, and a plurality of upright members nesting with upright members of an adjacent tray. A support structure is disposed between the opposed end members to form an arc corresponding to a curved surface of an article to be supported by the support structure. A pin is received through each of the upright members of the plurality of stackable trays to retain the stackable trays in a stacked configuration.

Technical advantages of the wheeled shipping cart include nestability of the carts while they are supporting product. This facilitates packing of an intermodal container for shipping. In addition, the arcuate support surface of each individual tray fully supports a corresponding arcuate surface of the article supported by the tray.

Other technical advantages will be readily apparent to one of ordinary skill in the art from the following figures, descriptions, and claims. Moreover, while specific advantages have been described above, various embodiments may include all, some, or none of the enumerated advantages.

BRIEF DESCRIPTION OF THE FIGURES

The accompanying drawings facilitate an understanding of the various embodiments.

DETAILED DESCRIPTION

A wheeled shipping cart with stackable trays is constructed with round and/or square tubing and curved sheet metal. These shipping carts fully support large products or articles with curved surfaces. In addition, the shipping trays can be stacked and secured together in order to ship and protect the maximum amount of product in the minimum amount of floor space. This also allows for the shipping carts or one or more trays separate from the carts to be removed via forklift. This is particularly useful for unloading multiples of large and heavy items one at a time. An end user may move multiple products at one time from storage to the point of deployment. The shipping trays may also be mounted on a cart base with lockable swivel casters to facilitate transportation within facilities.

The square and round steel framing and precision sheet metal of the trays is formed at an arc corresponding to that of the product. This provides the benefit of fully supporting the long curved faces of the product and protecting the integrity of the shape during transport and storage. The trays and/or carts can also support and protect the shape of molded products with curved surfaces from deformity during the curing process.

The arrangement of the round steel framing and the curvature in the sheet metal can be constructed to suit a wide variety of different curved product geometries, including being constructed to have a concave support surface.

Figure 1:
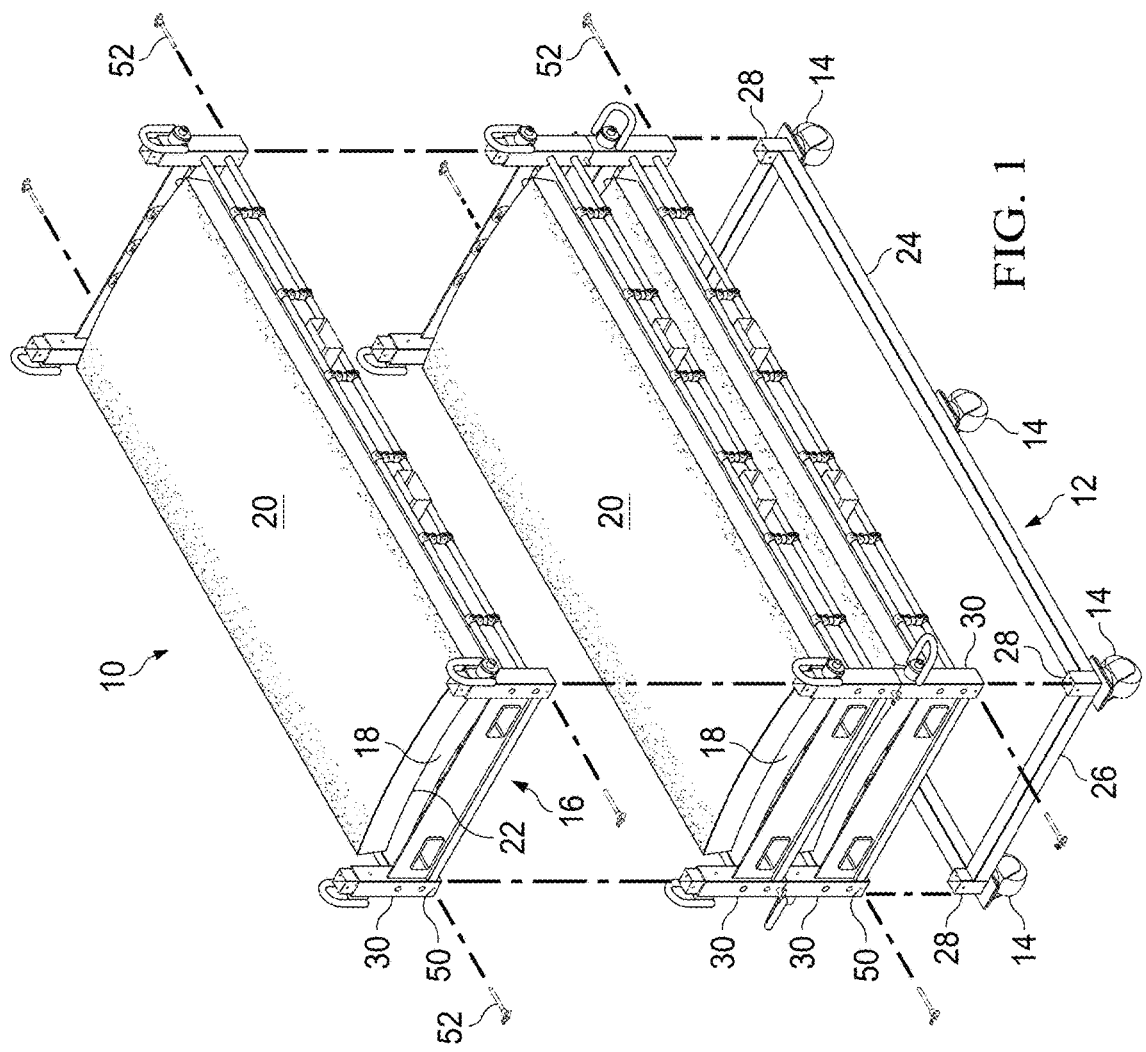
FIG. 1 is a partially exploded, perspective view of a wheeled shipping cart with stackable trays according to the teachings of the present.

FIG. 1 is a partially exploded, perspective view of a shipping/transport cart 10 according to the teachings of the present disclosure. The shipping cart 10 includes a cart frame 12 to which a plurality of casters 14 are attached. The cart frame 12 supports a plurality of trays 16, for example three trays 16, in a stacked arrangement. A support surface 18 of each tray 16 conforms to an arcuate surface 22 of a product or article 20 for example, a tile with an arcuate bottom surface.

The cart frame 12 is formed by perimeter square steel tubing members that are welded together to form a rectangular perimeter. Other suitable materials may form the cart frame 12, such aluminum tubing. The tubing may have a round as opposed to square shape. In one embodiment, steel for the cart frame 12 provides sufficient structural integrity to support up to 10,000 pounds. The casters 14 are heavy duty lockable swivel casters that are welded or otherwise secured to each of the four corners of the cart frame 12 proximate to the junction of a longitudinal perimeter member 24 with a cart frame end member 26. For additional support, a pair of casters 14 is attached at a center of each longitudinal perimeter member 24. These casters 14 may reduce bending of the longitudinal perimeter members 24 under a load. The casters 14 are lockable to prevent the cart 10 from unintentional rolling. Of course, the casters 14, when unlocked, allow the shipping cart 10 and the products 20 loaded onto the shipping cart 10 to be easily moved or transported, particularly over flat and smooth surfaces.

A male member 28 is welded or otherwise secured to each corner of the cart frame 12. Each of the male members 28 is received by a corresponding female end of an upright member 30 of a tray 16 to allow the tray 16 to be transported by the cart frame 12, and more particularly by the casters 14 on the cart frame 12. According to an alternate embodiment, the cart frame may have equally spaced cross members for additional strength.

As shown in FIG. 1, the cart frame 12 supports a plurality of stackable trays 16. Each tray may support a product 20 that weighs approximately 1,200 pounds. According to one embodiment, the cart frame 12 supports six to eight trays 16 in stacked arrangement with each tray supporting the product 20. One, two, three, four, or five trays 16 may likewise be supported by the cart frame 12. According to certain embodiments, more than eight trays 16 may be supported by the cart frame 12. More trays 16 may be stacked when the shipping cart 10 is stored and is not being used to ship or transport a product.

Figure 2A:
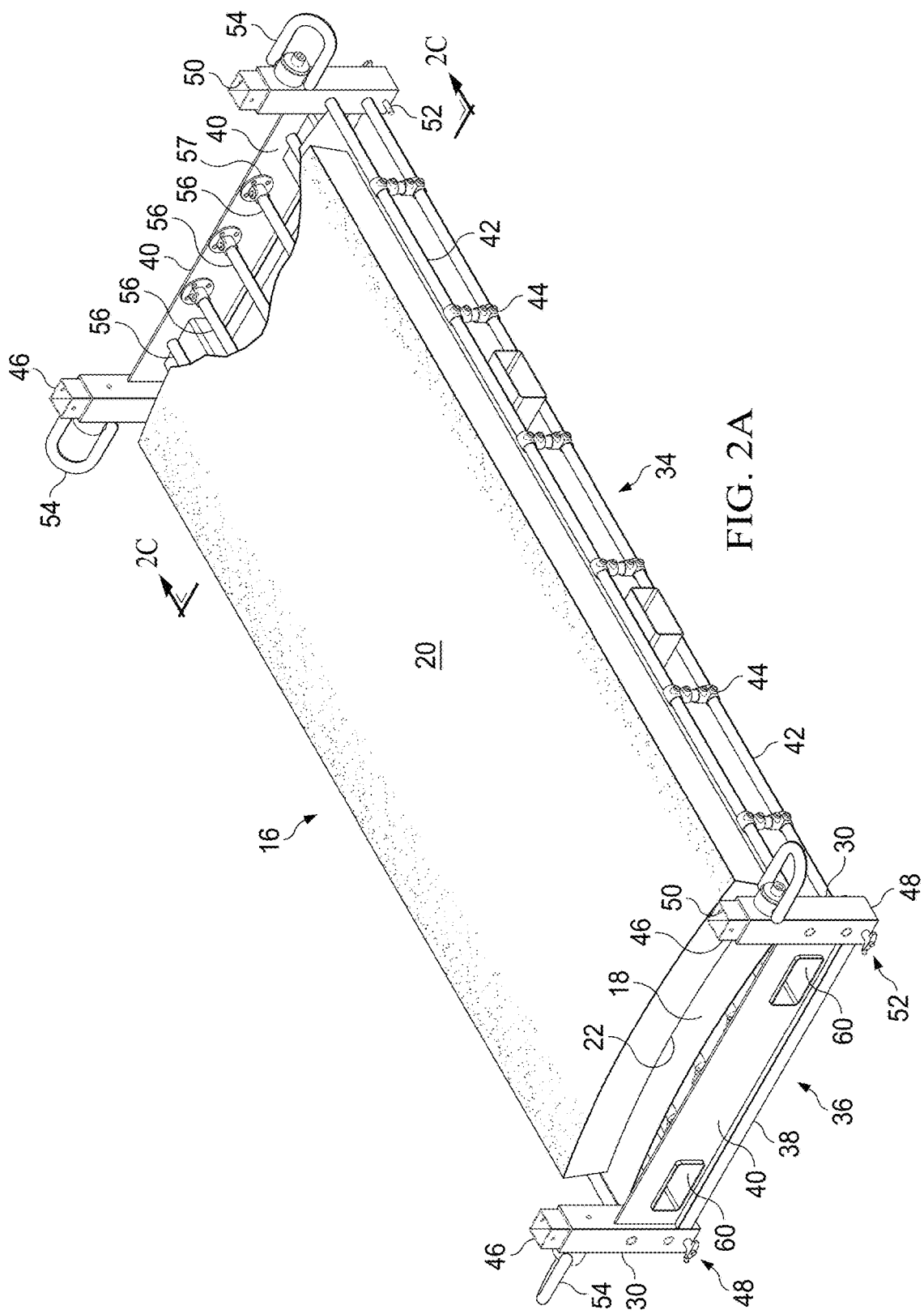
FIGS. 2A and 2B are perspective views with portions broken away of a single stackable tray with a curved product which it supports.
Figure 2B:
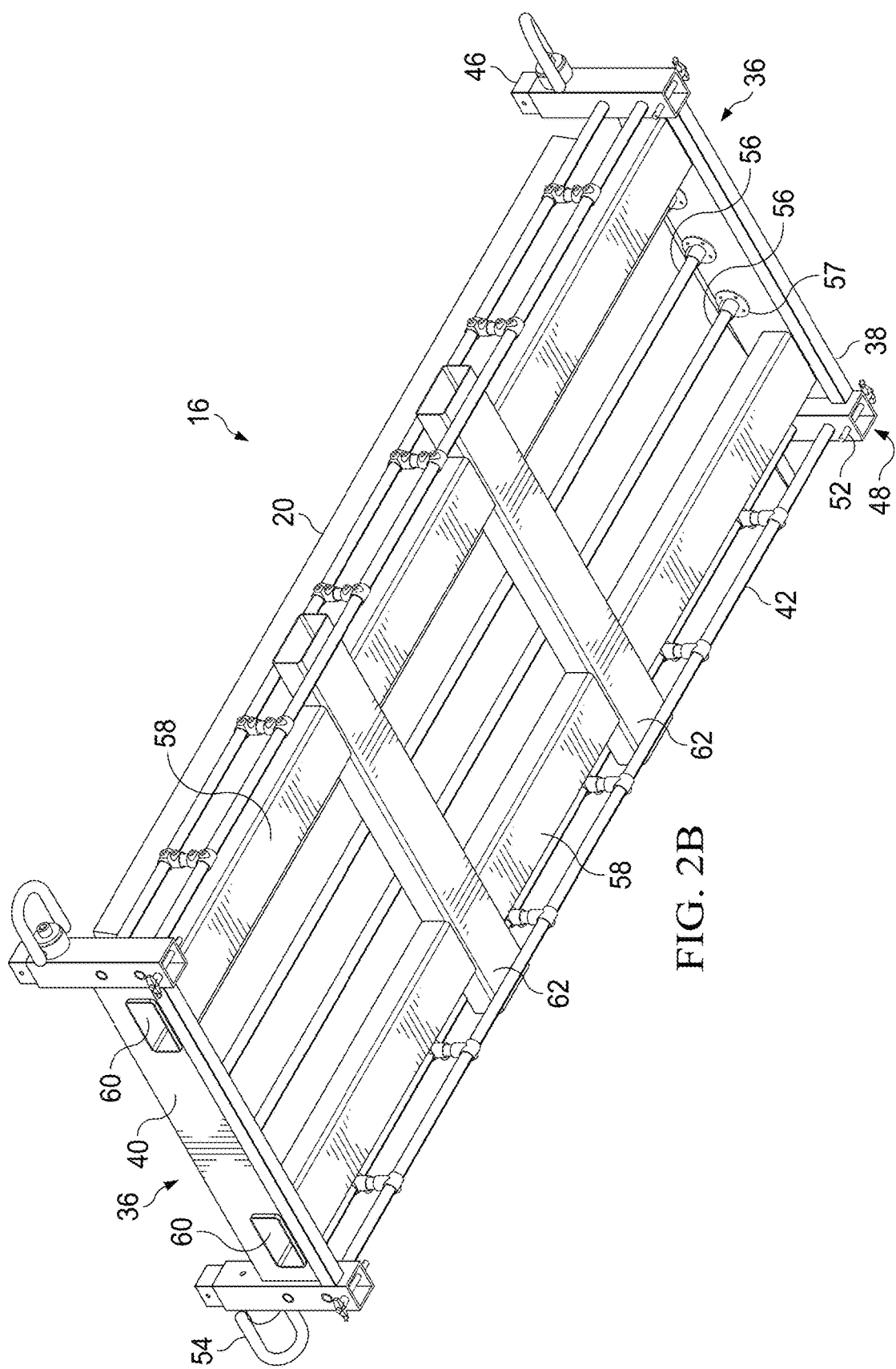

Reference is made to FIGS. 2A and 2B with continued reference to FIG. 1. FIGS. 2A and 2B are perspective views of a single stackable tray 16 supporting a product 20 with a curved bottom surface 22. The tray 16 includes a tray frame 34 formed of end members 36 disposed at opposite ends. The end members are formed of square steel tubing 38 and steel plate 40 (or alternatively aluminum or composite polymeric material) that is welded or otherwise secured to square-shaped steel tubing 39. The square tubing 38 and the steel plate 40 of the end members 36 are welded or otherwise attached to the upright members 30. The tray frame 34 also includes longitudinal perimeter members 42 extending from one end member 36 to the opposite end member 36. The longitudinal perimeter members 42 are square or circular-shaped tubing. According to one embodiment, on each side of the tray frame 34, one end of a pair of longitudinal perimeter members 42 are welded or otherwise secured to the upright members 30 at one end of the tray frame 34 and secured to the upright members 30 at the opposite end of the tray frame 34. A plurality of pipe hangers 44 are spaced apart along the length of the pair of longitudinal perimeter members 42 to connect the upper and lower longitudinal perimeter members 42 to each other on the same side and add structural strength to the tray frame 34 and reduce bending of either of the longitudinal support members under the weight of the curved product supported by the stackable tray 16.

Each of the upright members 30 has a male end 46 and a female end 48 to enable secure stacking of trays 16 on top of each other and to the corresponding male members 28 of the cart frame 12. For example, as shown in FIG. 1, the male end 46 of each of the four upright members 30 of a lower tray 16 is received within a female end 48 of each of the upright members 30 of an upper stackable tray 16 to stack the upper tray 16 on the lower tray 16. A pin hole 50 is formed in each of the female ends 48 and the male ends 46 of the upright members 30. These pin holes 50 are aligned when the male end 46 is received in a female end 48. A pin 52 is received through the pin holes 50 in the female end 48 of the upright member 30 of the upper tray 16 and the male end 46 of the upright member 30 in the lower tray 16 to secure the upper tray 16 to the lower tray 16 in a stacked arrangement. The pin 52 may be a cotter pin or other type of pin that is known in the art. Removing the pins 52 allows the upper tray 16 to be separated and removed from the lower tray 16.

Each tray 16 is identical and any suitable stacking of trays 16 can be moved by the cart frame 12 or by a crane. Lifting/tie down rings 54 that are welded or otherwise secured to each of the upright members 30 allow one tray 16 or a plurality of stacked trays 16 secured in a stacking arrangement using the pins 52, as described above, to be lifted by a crane or other lifting device that is configured to lift the trays 16 and the supported product 20 from above.

A plurality of longitudinal support members 56 support the arcuate support surface 22 that is formed of sheet metal, for example steel or aluminum. For each longitudinal support member 56, one end is welded or otherwise secured to one end member 36 and the opposite end of each longitudinal support member 56 is welded or otherwise secured to the opposite end member. According to one embodiment, a flanged pipe fitting 57 is bolted, welded, or otherwise secured to the steel plate 40 of the end member 36. The flanged pipe fitting 57 receives an end of the longitudinal support member 56. The longitudinal support member 56 may be secured in the flanged pipe fitting 57 by a set screw, welding, or other suitable fastening device or procedure. According to an alternate embodiment, a through hole may be made in the steel plate and the flanged pipe fitting 57 may be bolted, welded, or otherwise secured to an opposite face of the steel plate 40 with the pipe and the fitting portion extending through the through hole in the steel plate. According to yet a further alternate embodiment, the flanged pipe fitting 57 may be omitted and the longitudinal support member 56 extends through a through hole formed in the steel plate 40 to which the longitudinal support member 56 is welded or otherwise secured. In an alternate embodiment, a recess may be formed in the steel plate 40. The flanged pipe fitting 57 or the end of the longitudinal support member 56 may be received and welded in the recess.

Figure 2C:
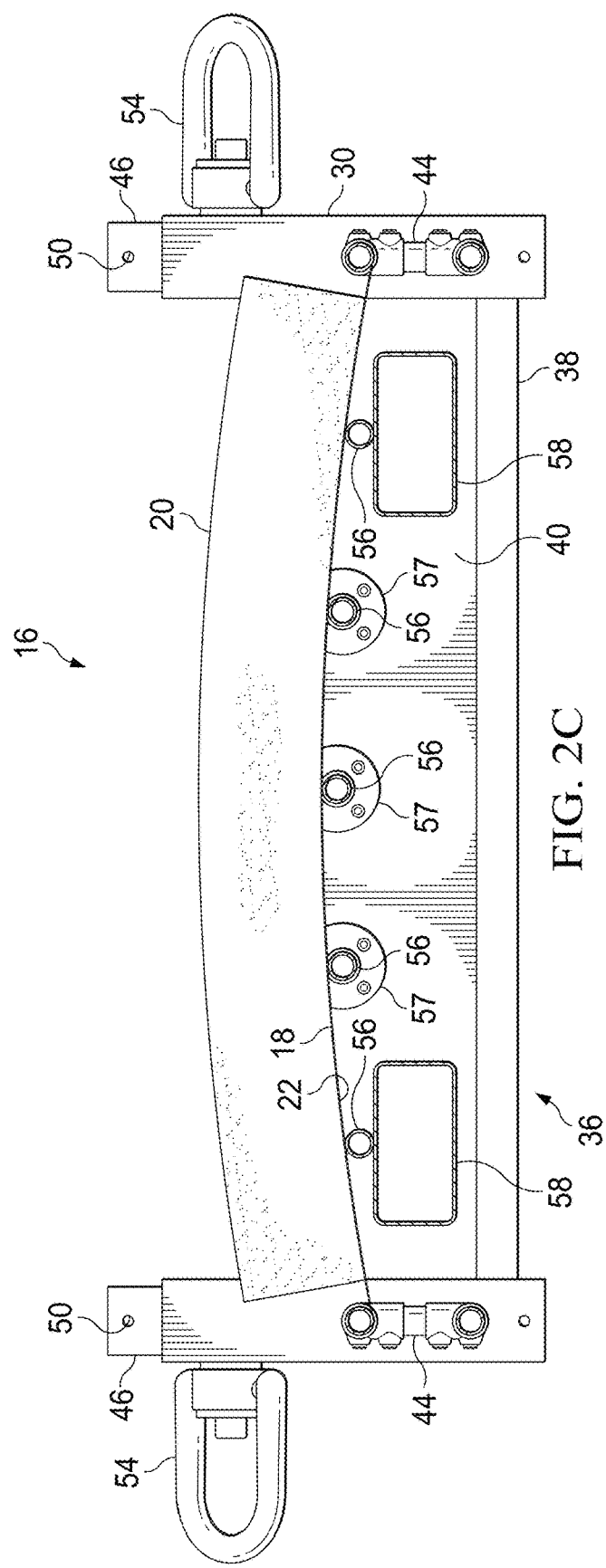
FIG. 2C is a section view of a single stackable tray showing an orientation of the longitudinal support members.

FIG. 2C illustrates the orientation of the longitudinal support members 56 with respect to each other. The longitudinal support members 56 are arranged with respect to each other to form an arc with the longitudinal support members 56 in the center being positioned above the longitudinal support members 56 positioned outside the center longitudinal support members 56. For example, a center longitudinal support member 56 is flanked by a pair of inner longitudinal support members 56 positioned below the center longitudinal support member 56. A pair of outer longitudinal support members 56 flank the pair of inner longitudinal support members 56 and are disposed below the inner longitudinal support members 56. Together, the support members 56 form an arc. Although five longitudinal support members 56 are illustrated, the present disclosure contemplates any suitable number of longitudinal support members 56, including more or less than five. Cross members disposed spaced apart along the length of the longitudinal support members 56 may be used to provide additional structural support.

According to an alternate embodiment, the longitudinal support members 56 may be arranged such that the center longitudinal support member 56 is below the members 56 that flank it, and the members 56 will support a support surface that is convex. The convex support surface corresponds to a concave surface of the product.

According to certain embodiments, the support surface 18 is formed of precision sheet metal that is bent into an arc and welded to the longitudinal support members 56. The support surface 18 directly supports the product 20. As described above, the arc of the support surface 18 corresponds to the arc of the underside 22 of the supported product 20. In one embodiment, a radius of the arc of the arrangement of the longitudinal support members 56 and the support surface 18 is in a range of 180-220 inches, for example approximately 204 inches. According to an alternate embodiment, a sufficient number of longitudinal support members 56 may be positioned adjacent each other in an arced arrangement as described above to form an arcuate support surface that directly supports the product 20. In this embodiment, the precision sheet metal may be omitted.

Supporting the arced underside surface 22 of the product 20 with an arcuate support surface 18 ensures that the shape of the product 20 is not distorted while on the tray 16. For example, in transport the product 20 may experience elevated temperatures for an extended period of time. Under such conditions, a non-rigid product 20, for example one formed of a polymeric composite material may tend to conform to the shape of the surface that supports it. Thus, if the product were supported by a flat, level surface, the product may tend to conform to the level surface and in so doing become insufficient for its intended use.

As shown in FIG. 2B, each tray 16 includes fork receiving members that are configured to receive the forks of a forklift to carry one tray 16 or multiple trays 16 in a stacked configuration. The fork receiving members may also be used to lift a cart frame 12 supporting multiple trays 16 if rolling the cart 10 is not practicable. A pair of longitudinal fork receiving members 58 is secured at opposite ends to the end members 36. The longitudinal fork receiving members 58 are generally hollow tubes with a rectangular cross section that corresponds to the shape of forks of a forklift. An opening 60 of each of the longitudinal fork receiving members 58 is accessible through the end members 36, and more particularly through the steel plate 40. This allows a fork of a forklift to engage the longitudinal fork receiving members 58 from either end of the tray 16.

A pair of transverse fork receiving members 62 is disposed across the tray 16 such that they are generally perpendicular to the longitudinal fork receiving members 58. Each of the transverse fork receiving members 62 includes a lateral cutout (not illustrated) to allow the forks received in the longitudinal fork receiving members 58 to pass through the transverse fork receiving members 62 such that the forks extend beyond the center of gravity of the tray 16 to safely lift one or more trays 16. Similar to the longitudinal fork receiving members 58, the transverse fork receiving members 62 are formed of metal tubing, for example steel tubing. The transverse fork receiving members 62 are hollow and have a rectangular shaped cross section that corresponds to the shape of a fork of a forklift. The forks may be received from either side of the transverse fork receiving members 62 to allow a forklift to engage and lift the tray 16. The transverse fork receiving members 62 are positioned along the length of the tray 16 to ensure that the tray 16 is balanced when it is lifted by a forklift.

The transverse fork receiving members are welded or otherwise secured to the longitudinal perimeter members 42. According to an alternate embodiment, the tray may include one set of longitudinal fork receiving members and omit the transverse fork receiving members. According to another alternate embodiment, the tray may include the transverse fork receiving members and not include the longitudinal fork receiving members.

Figure 3:
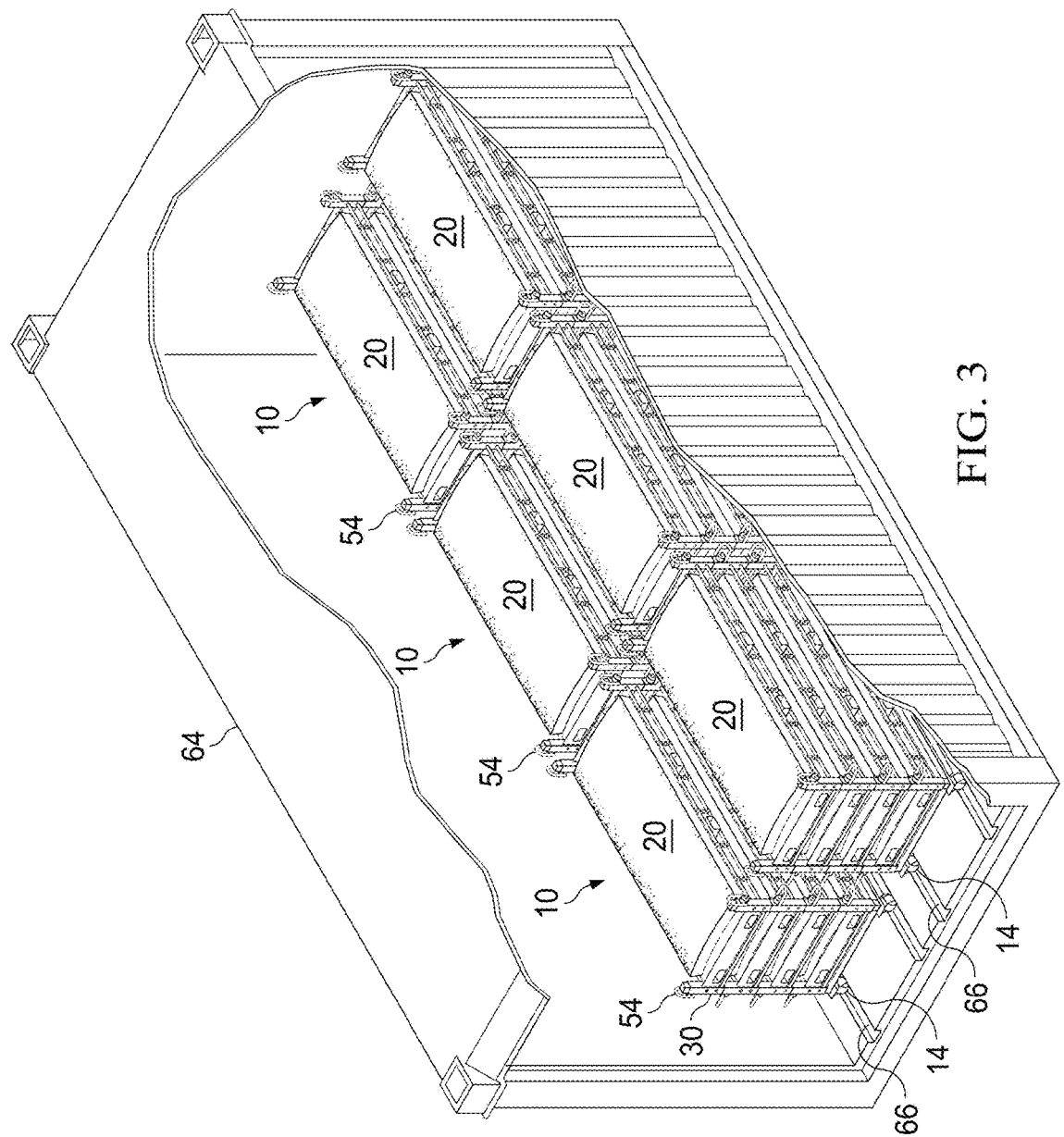
FIG. 3 is a perspective view of a plurality of shipping carts with stackable trays loaded into an intermodal shipping container.

Reference is made to FIG. 3, which is a perspective view of an intermodal shipping container 64 (also referred to as a conex container), with portions broken away to show the shipping carts 10 contained by the container 64. According to one embodiment, caster guides 66 are disposed on a floor of the container 64. The caster guides 66 receive the casters 14 of each shipping cart 10 to guide the carts 10 on to the container and ensure proper spacing. The caster guides 66 reduce or eliminate lateral movement of the wheeled carts 10. According to an alternate embodiment, the caster guides 66 are angle bar that is secured to the floor of the container 64. The angle bar is sized to receive the casters 14.

The lifting/tie down rings 54 are used to secure the wheeled carts to the walls and or the floor of the intermodal container 64 to ensure safe shipping of the product 20. When not used, a lifting/tie down ring 54 may be folded such that it is parallel to the upright members 30 of the tray 16. According to one embodiment, a single intermodal container 64 can hold six wheeled carts 10 with four stackable trays 16 each in the configuration shown in FIG. 3.

Once the loaded intermodal container 64 reaches its destination, the wheeled carts 10 are rolled out of the container 64 with the products supported by the individual trays 16. A crane equipped with a suction cup can lift the product 20 off the top tray 16 from overhead and place the product where desired by the end user. The top tray can be removed to allow the product in the tray 16 below to be accessed by the suction cup. After placement of all of the products 20, the empty shipping carts 10 can be placed back on the intermodal container 64 and returned to the product supplier to be loaded with additional curved product on the shipping carts 10 and shipped again to the end user.

This disclosure has described the materials of the cart frame 12 and the individual trays 16 as being steel or aluminum. It should be noted that this disclosure contemplates the selection of any suitable materials based on the weight of the product supported by the trays and cart. For example, certain embodiments may include frame and/or support members formed from composite polymeric materials, fiberglass, reinforced plastics, and the like.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below," "top" and "bottom" and the like are used as words of convenience to provide reference points and are not to be construed as limiting terms.

In addition, the foregoing describes only some embodiments of the invention(s), and alterations, modifications, additions and/or changes can be made thereto without departing from the scope and spirit of the disclosed embodiments, the embodiments being illustrative and not restrictive. For example, the frame and support members may be replaced by tubing of any suitable material and may have any suitable cross section, such as circular, rectangular, or square.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An apparatus, comprising:
   a cart frame;
   a plurality of stackable trays supported by said cart frame, each stackable tray comprising:
      a tray frame comprising opposed end members, a plurality of longitudinal perimeter members disposed between the opposed end members, and a plurality of upright members nesting with upright members of an adjacent tray; and
      a support structure disposed between the opposed end members, the support structure comprising an arcuate upper support surface corresponding to a curved bottom surface of an article to be supported by the support structure, the support structure further comprising a plurality of longitudinal support members each forming an upper surface, the longitudinal support members disposed between the opposed end members in an arced arrangement such that the upper surfaces of the longitudinal support members are in contact with and support an underside of the arcuate upper support surface that supports the curved bottom surface of the article, wherein at least one of the longitudinal support members is positioned above other longitudinal support members to define the arced arrangement; and
   a plurality of pins each received through the upright members of the plurality of stackable trays to retain the stackable trays in a stacked configuration.

2. The apparatus of claim 1 wherein the longitudinal support members comprise a plurality of elongate tubes.

3. The apparatus of claim 1 wherein the arcuate upper support surface is formed of sheet metal.

4. The apparatus of claim 1 wherein the cart frame includes a plurality of wheels.

5. The apparatus of claim 1 further comprising a lifting ring attached to each upright member.

6. The apparatus of claim 1 further comprising a pair of longitudinal fork receiving members each coupled to the opposed end members, the pair of longitudinal fork receiving members sized and shaped to receive a fork of a forklift.

7. The apparatus of claim 6 further comprising a pair of transverse fork receiving members extending perpendicular to the longitudinal fork receiving members, the transverse fork receiving members being sized and shaped to receive the fork of the forklift.

8. The apparatus of claim 1 further comprising a pair of transverse fork receiving members extending perpendicular to the longitudinal perimeter members, the transverse fork receiving members being sized and shaped to receive a fork of a forklift.

9. The apparatus of claim 1 wherein each of the plurality of stackable trays is configured to support the article in the stacked configuration.

10. The apparatus of claim 1 wherein each upright member of each tray frame is disposed at a corner of the tray frame.

11. The apparatus of claim 1 wherein the arcuate upper support surface is convex and supports a concave curved bottom surface of the article.

12. The apparatus of claim 1 wherein the at least one of the longitudinal support members comprises at least one center longitudinal support member positioned above the longitudinal support members positioned outside the center longitudinal support member.

13. The apparatus of claim 12 further comprising the center longitudinal support member flanked by inner longitudinal support members positioned below the center longitudinal support member, and the inner longitudinal support members flanked by outer longitudinal support members positioned below the inner longitudinal support members.

14. The apparatus of claim 2 wherein the support structure further comprises a plurality of flanged pipe fittings secured to the opposed end members, and the flanged pipe fittings configured to respectively receive terminal ends of the longitudinal support members.

15. The apparatus of claim 14 wherein the longitudinal support members or the flanged pipe fittings are disposed in a through hole or a recess formed in the opposed end members.

16. A shipping cart, comprising:
   a first tray comprising a first tray frame comprising first opposed end members, a plurality of first longitudinal perimeter members disposed between the first opposed end members, and a plurality of first upright members disposed at each corner of the first tray frame, each first upright member defining a first female end and a first male end, the first tray further comprising a first support structure disposed between the first opposed end members, the first support structure comprising a first support surface that is convex upward, the first support surface corresponds to a concave downward bottom surface of an article, the first support structure further comprising a plurality of first longitudinal support members disposed between the first opposed end members, the first longitudinal support members positioned adjacent to each other in a convex upward arced arrangement to support the first support surface;
   a second tray comprising a second tray frame comprising second opposed end members, a plurality of second longitudinal perimeter members disposed between the second opposed end members, and a plurality of second upright members disposed at each corner of the second tray frame, each second upright member defining a second female end and a second male end, the second tray further comprising a second support structure disposed between the second opposed end members, the second support structure comprising a second support surface that is convex upward, the second support surface corresponds to the concave downward bottom surface of the article, the second support structure further comprising a plurality of second longitudinal support members disposed between the second opposed end members, the second longitudinal support members positioned adjacent to each other in a convex upward arced arrangement to support the second support surface;
   a plurality of pins each pin received in pin holes to secure the second male ends of the second tray in the first female ends of the first tray and secure the first tray in a stacked configuration with the second tray, the first tray being vertically spaced apart from the second tray to accommodate the article supported by the second tray;

a cart supporting a plurality of wheels and comprising a cart frame and cart upright members disposed at corners of the cart frame, the cart upright members having cart male ends received in the second female ends of the second tray; and a second plurality of pins securing the second tray to the cart upright members to secure the first and second trays in a stacked configuration with the cart.

17. The shipping cart of claim 16 wherein the first lateral longitudinal support members comprise a plurality of first elongate tubes, and wherein the second lateral longitudinal support members comprise a plurality of second elongate tubes.

18. The shipping cart of claim 16 wherein the first support surface, the second support surface or both is formed of sheet metal.

19. The shipping cart of claim 16 wherein the first and second trays each further comprises:
   a pair of longitudinal fork receiving members each coupled to the opposed end members, the pair of longitudinal fork receiving members sized and shaped to receive a fork of a forklift; and
   a pair of transverse fork receiving members extending perpendicular to the longitudinal fork receiving members, the transverse fork receiving members being sized and shaped to receive the fork of the forklift.

20. The shipping tray of claim 16 wherein the first longitudinal support members comprise at least one first center longitudinal support member positioned above the first longitudinal support members positioned outside the first center longitudinal support member, and wherein the second longitudinal support members comprise at least one second center longitudinal support member positioned above the second longitudinal support members positioned outside the second center longitudinal support member.

21. The shipping tray of claim 20 further comprising:
   the first center longitudinal support member flanked by a pair of first inner longitudinal support members positioned below the first center longitudinal support member, and the first inner longitudinal support members flanked by a pair of first outer longitudinal support members positioned below the first inner longitudinal support members; and
   the second center longitudinal support member flanked by a pair of second inner longitudinal support members positioned below the second center longitudinal support member, and the second inner longitudinal support members flanked by a pair of second outer longitudinal support members positioned below the second inner longitudinal support members.

22. The shipping tray of claim 16 further comprising:
   the first longitudinal support members each forming a first upper surface, the first longitudinal support members disposed between the first opposed end members in the convex upward arced arrangement such that the first upper surfaces of the first longitudinal support members are in contact with and support an underside of the first support surface; and
   the second longitudinal support members each forming a second upper surface, the second longitudinal support members disposed between the second opposed end members in the convex upward arced arrangement such that the second upper surfaces of the second longitudinal support members are in contact with and support an underside of the second support surface.

23. The shipping tray of claim 16 wherein the first and the second support structure each further comprise a plurality of flanged pipe fittings secured to the first and the second opposed end members, and the flanged pipe fittings configured to respectively receive terminal ends of the first and the second longitudinal support members.

* * * * *